UNITED STATES PATENT OFFICE.

WILLIAM P. KOOKOGEY, OF BROOKLYN, NEW YORK, ASSIGNOR TO THE KOOKOGEY ELECTRIC COMPANY.

MODE OF PREPARING SOLUTION COMPOUNDS FOR GALVANIC BATTERIES.

SPECIFICATION forming part of Letters Patent No. 395,835, dated January 8, 1889.

Application filed June 11, 1888. Serial No. 276,773. (No specimens.)

*To all whom it may concern:*

Be it known that I, WILLIAM P. KOOKOGEY, of the city of Brooklyn, in the county of Kings and State of New York, have invented a new and useful Method of Preparing Solution Compounds for Galvanic Batteries, of which the following is a specification.

My invention relates especially to the preparation of that class of battery compounds, composed of bichromate of soda, sulphate of soda, and sulphuric acid, which are designed to be kept and transported in the dry state and converted into solutions for use by merely dissolving them in water. Heretofore the compound has been prepared by mixing the ingredients all at once. The character of the ingredients is such that at first the mass is in a liquid or semi-liquid state, but gradually changes into a coarse powder upon stirring, and the difficulty has been to form a homogeneous mass—*i. e.*, to make the mixing complete before this change takes place. Small lumps of one or other of the ingredients are likely to form in the mass and make its strength irregular, so that it is impossible to know how much to use to produce a given strength in a cell. But I have discovered that this difficulty may be avoided and a much more efficient compound may be produced by adopting the method of this invention, which is, in general, to first dissolve the whole of the sulphate and bichromate in about one half of the quantity of acid to be used and then add the remaining half of the acid as quickly as possible, stirring vigorously. By some peculiar property of the ingredients the chemical combinations which cause the change from the liquid to the solid form go on more evenly in this way and result in a much more homogeneous mass. The proportion of the acid to be used in the first place should be all that can be added without causing the change from liquid to solid to begin at any point. The entire mass is then ready for the change all at once.

Another advantage is that by this process a given quantity of the compound may be made in about half the time that it would otherwise take.

To describe more in detail the best method of applying this process: Take eight parts of sulphate of soda, seven parts of bichromate of soda, and sixteen parts of sulphuric acid—the parts to be by weight and the acid to be about 66° Baumé; heat about half of the acid to about 150° Fahrenheit and dissolve the sulphate of soda in it; add the bichromate of soda and dissolve; add the remainder of the acid all at once and as quickly as possible, and stir vigorously until the mass solidifies. It becomes a nearly solid mass of chromium-trioxide and acid-sulphate of soda. The degree of heat to which the first half of the acid is to be brought, if between about 100° and 212° Fahrenheit, is unimportant—150° is the most convenient. The second half of the acid is preferably added not heated.

I claim as my invention—

The process of making a battery dry compound whose ingredients are sulphate of soda, bichromate of soda, and sulphuric acid, consisting of the following steps, viz: first, dissolving the sulphate and the bichromate in about one half of the quantity of acid to be used, the same being heated, and then adding quickly the remainder of the acid, substantially as described.

In witness whereof I hereunto set my hand, in the presence of two witnesses, this 9th day of June, 1888.

WM. P. KOOKOGEY.

Witnesses:
WALTER S. LOGAN,
SALTER S. CLARK.